United States Patent
Makridis

Patent Number: 5,446,965
Date of Patent: Sep. 5, 1995

[54] CAKE DIVIDER

[76] Inventor: Maria Makridis, 82 Lygon Street, East Brunswick, Victoria 3056, Australia

[21] Appl. No.: 142,356
[22] PCT Filed: May 22, 1992
[86] PCT No.: PCT/AU92/00232
§ 371 Date: Nov. 23, 1993
§ 102(e) Date: Nov. 23, 1993
[87] PCT Pub. No.: WO92/20270
PCT Pub. Date: Nov. 26, 1992

[30] Foreign Application Priority Data

May 23, 1991 [AU] Australia .............. PK6283

[51] Int. Cl.⁶ .................................. B26B 3/04
[52] U.S. Cl. ......................... 30/303; 30/315; 30/337
[58] Field of Search ............... 30/301, 302, 303, 314, 30/315, 316, 304, 305, 320, 337; 99/537

[56] References Cited

U.S. PATENT DOCUMENTS

| | | | |
|---|---|---|---|
| 1,250,676 | 12/1917 | Segerc | 30/302 |
| 1,424,389 | 8/1922 | Wyatt. | |
| 1,706,934 | 3/1929 | Miles et al. | |
| 2,003,253 | 5/1935 | Deutsch. | |
| 2,555,690 | 6/1951 | Guerra. | |
| 2,661,535 | 12/1953 | Berles | 30/305 |
| 3,231,973 | 2/1966 | Veskrna. | |
| 3,677,168 | 7/1972 | Bell. | |
| 4,114,265 | 9/1978 | Bailey. | |
| 4,297,932 | 11/1981 | Wells, Jr. et al. | |
| 4,359,159 | 11/1982 | Pollard. | |
| 4,411,066 | 10/1983 | Allahverdian. | |
| 4,625,403 | 12/1986 | Jansson et al. | |
| 4,693,154 | 9/1987 | Karlsson. | |
| 5,129,159 | 7/1992 | Fuenzalida | 30/303 |

FOREIGN PATENT DOCUMENTS

| | | | |
|---|---|---|---|
| 1528730 | 5/1968 | France. | |
| 2252737 | 6/1975 | France | 30/303 |
| 58796 | 1/1947 | Netherlands. | |
| 2113534 | 8/1983 | United Kingdom. | |
| 2173392 | 10/1986 | United Kingdom. | |

Primary Examiner—Richard K. Seidel
Assistant Examiner—Raymond D. Woods
Attorney, Agent, or Firm—Larson and Taylor

[57] ABSTRACT

A cake slicer and divider includes a core with a plurality of arms detachably securable thereto to project radially from the core. The core includes locators, such as slots to support the arms, the locators being positioned in an array on the core whereby a plurality of arms may be attached to the core to extend radially from the core. Each pair of adjacent arms defines a segment and the number of segments is variable in dependence on the number of arms that are attached to the core. Each arm is an elongate planar member with a cutting edge on its under edge. A force transmitting member is provided at an upper end of the core whereby hand pressure on the force transmitting member imparts a downward force on the core and arms to cause the cutting edges of the arms to slice the cake into segments enclosed between adjacent planar members so that the slicer and divider when in situ with the sliced cake protects the segments from air contact.

4 Claims, 3 Drawing Sheets

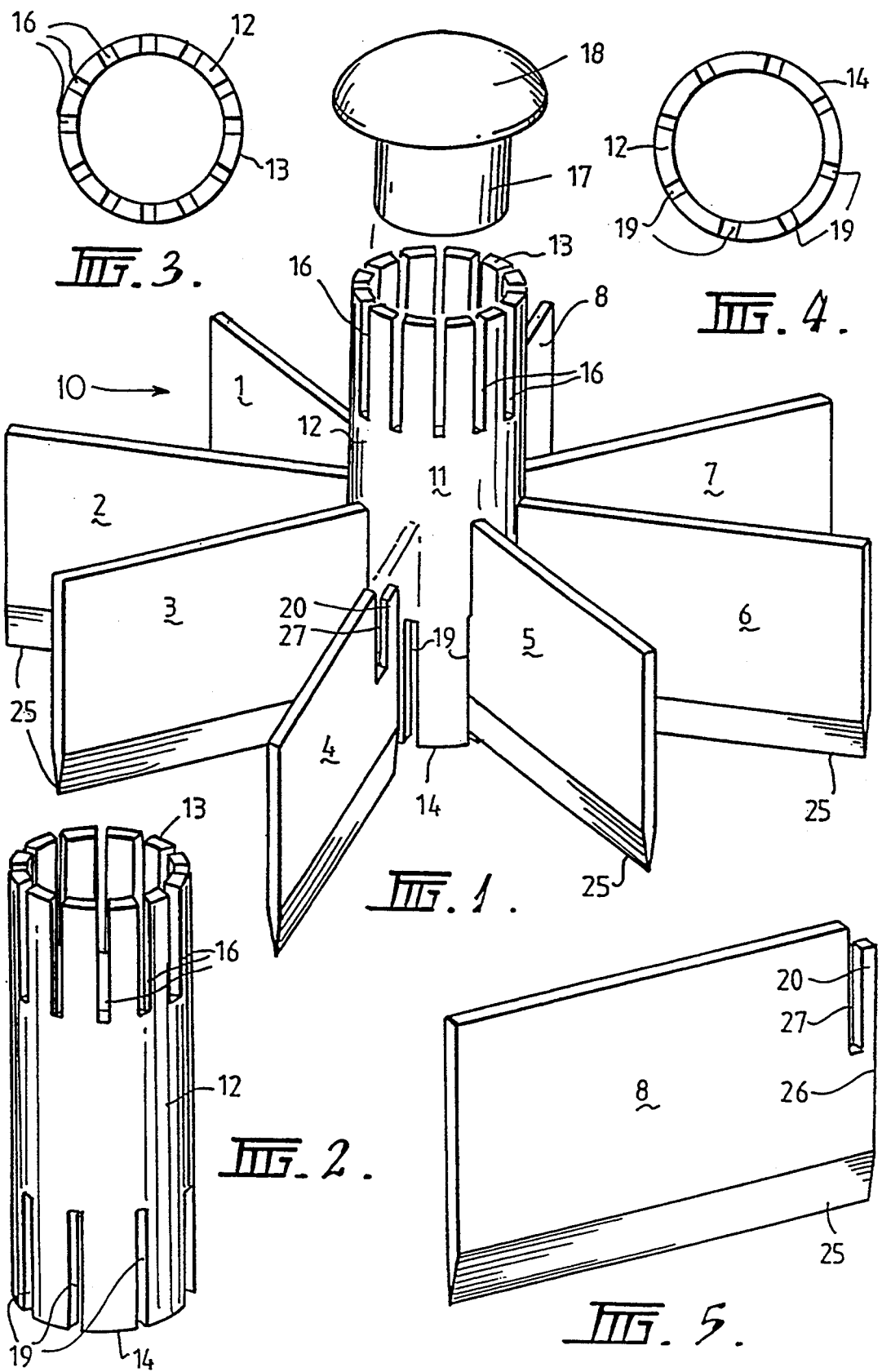

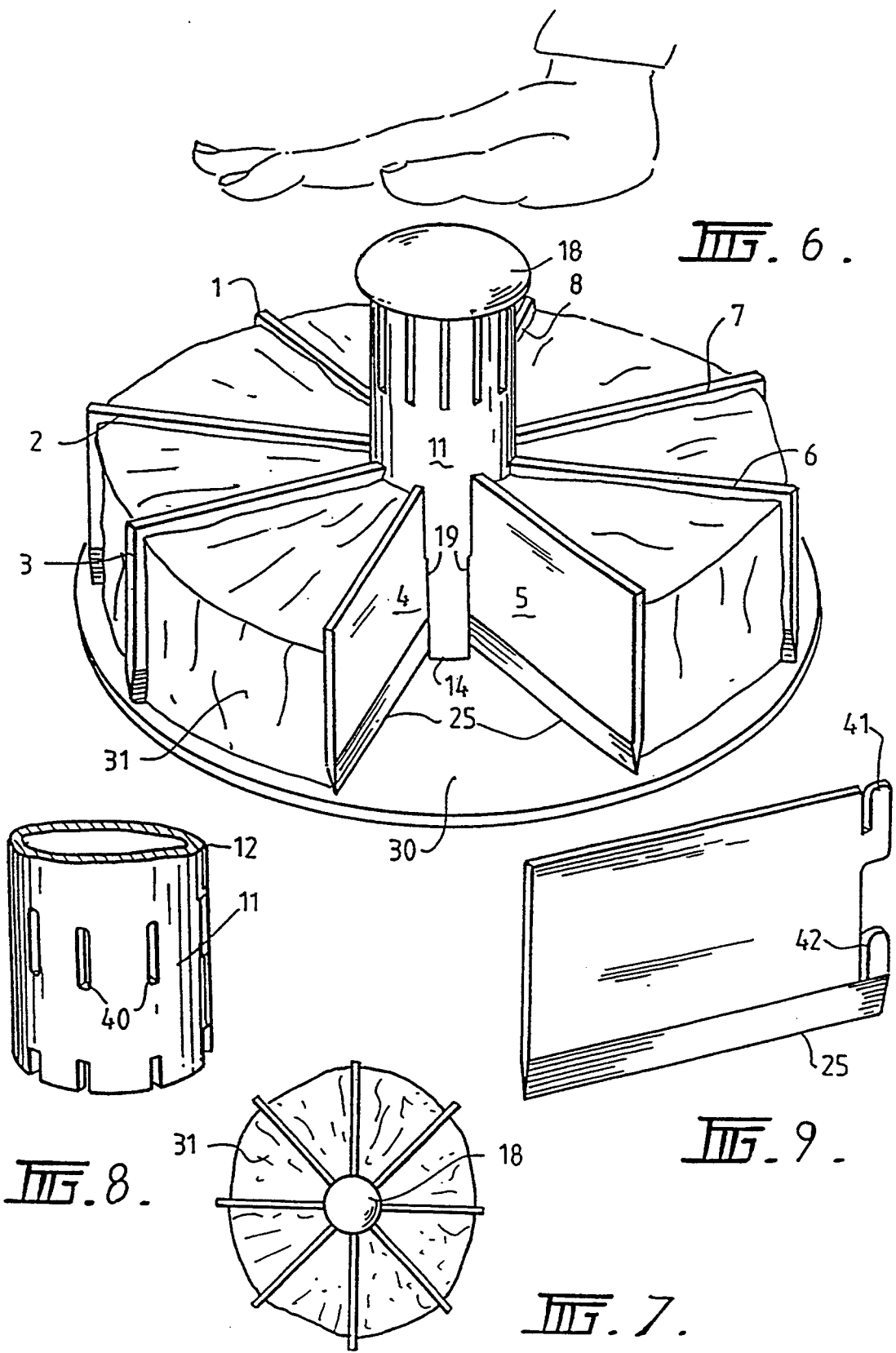

CAKE DIVIDER

INTRODUCTION

This invention relates to a cake divider and especially relates to a divider that operates to cut a cake into discrete slices whilst at the same time protecting the edges of adjacent slices from direct contact with the air.

Throughout this specification, it is understood that the expression "cake" embraces a variety of foodstuffs such as pies, quiches, and many other pastry items.

DISCUSSION OF PRIOR ART

In cafeterias, tea houses and restaurants, there is always a problem in keeping cakes fresh. A customer usually requires a single slice of cake and thus in a situation where a cake is sliced and not consumed immediately, there is a problem that the surfaces of slices of cake adjacent a slice that has been removed become exposed to air which causes the surface to become dry and hard and generally unpalateable. This results in the proprietor having to discard the outer slices which results in considerable waste. Another problem with cakes is the need for a careful and slow slicing operation to produce slices that are cut cleanly and evenly to again reduce wastage of cake. Hygiene also dictates that handling of foodstuffs be kept to a minimum.

It is these problems that have brought about the present invention.

SUMMARY OF THE INVENTION

In accordance with one aspect of the present invention there is provided a cake divider comprising a core with a plurality of arms detachably securable thereto to project from the core, each arm terminating on its underside with a cutting edge whereby in use, the divider can be positioned above a cake and downward pressure can be exerted on the core to force the arms to cut through the cake to produce a plurality of slices, and whereby as a slice is removed from the cake, the adjacent arms act as an air barrier against the exposed surfaces of the adjacent slices.

Preferably, the arms project radially from the core, downward displacement of the divider producing a plurality of segments defined by radial cuts. Alternatively, the arms extend laterally of the core in a parallel array so that downward displacement of the divider produces a plurality of parallel slices each separated by an arm.

In a preferred embodiment, each arm is provided with fastening means allowing the arms to be coupled to the core member in a variety of arrays defining slices of different sizes.

DESCRIPTION OF THE DRAWINGS

Embodiments of the present invention will now be described by way of example only with reference to the accompanying drawings in which:

FIG. 1 is a perspective view of a cake divider in accordance with a first embodiment;

FIG. 2 is a perspective view of a core that forms part of the divider shown in FIG. 1;

FIG. 3 is a plan view of the core shown in FIG. 2;

FIG. 4 is an underside view of the core of FIG. 2;

FIG. 5 is a perspective view of an arm that forms part of the divider shown in FIG. 1, FIG. 6 is a perspective view of the divider when pressed into a cake;

FIG. 7 is a plan view of the divider in position on a cake;

FIG. 8 is a perspective view of a modified core;

FIG. 9 is a perspective view of a modified arm for use with the core of FIG. 8.

DESCRIPTION OF THE PREFERRED EMBODIMENTS

Figure 10:
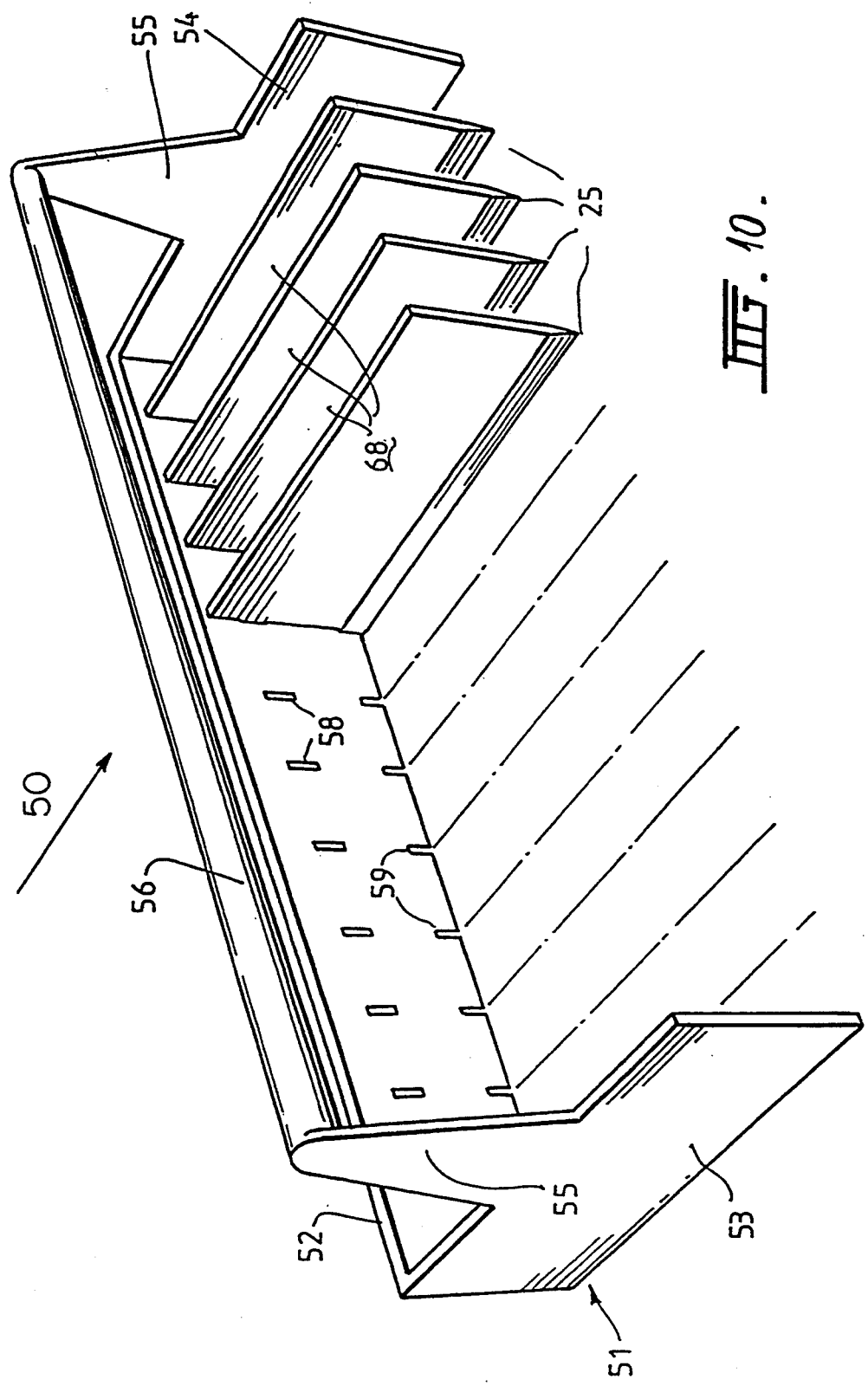
FIG. 10 is a perspective view of a divider for use with rectangular cakes.

The cake divider in accordance with a first embodiment is illustrated with reference to FIGS. 1 to 7. The divider 10 comprises a central core member 11 in the form of a cylindrical barrel 12 that is slotted at both ends 13 and 14. Twelve equally spaced axial slots 16 are positioned at the upper end 13 and the lower end 14 carries eight axial slots 19. Either end 13 or 14 is arranged to locate a downwardly extending annular flange 17 that is formed on a cap member 18 that is of greater diameter than the diameter of the barrel 12. The slots 16 or 19 are located around the periphery of either end 13, 14 of the barrel and serve as location means for fingers 20 formed on eight divider arm members 1 to 8 as shown in FIG. 1. The core 12 may however be inverted so that the slots 16 in the end 13 support twelve divider arms.

As shown in FIG. 5, each divider arm 8 is moulded in plastics and is of substantially rectangular cross-section with a tapered pointed cutting edge 25 provided on the undersurface. One side portion 26 of the arm is provided with an elongate slotted cut-out 27 that forms a location finger 20 that interfits within the slots 19 in the core barrel 12 so that the arms can simply be attached to the barrel by pushing each arm up the barrel from the base so that the slots interengage with the finger 20 of the arm.

FIGS. 8 and 9 illustrate a core 11, the barrel 12 of which has an array of elongate slots 40 positioned equally spaced about the mid-point of the circumference. The slots 40 serve to accommodate hooks 41 that are formed on the upper inner edges of the arms. The arms also have similar hooks 42 on the lower inner edges. This arrangement provides a more secure location of the arms against the core.

It is understood that the number of slots in the core barrel would vary in dependence on the number of arms that extend radially from the core barrel as shown in FIG. 1. For very large cakes, it is envisaged that up to twelve arms may extend in an equally spaced array from the core barrel. It is not essential that the spacing of the arms be equal so that a variation in the thickness of slices may be introduced.

It is further understood that whilst in the preferred embodiment the componentry namely the cap member 18 and arms 1 to 8 are moulded in plastics, it is possible for the arms to be made of sheet steel or other metallic composition. The core barrel 12 has been designed to accommodate four, six, eight, ten or twelve arms depending on the size of the cake and the size of slice that is to be defined by the arms.

The use of the divider 10 is illustrated with particular reference to FIGS. 6 and 7. An appropriate number of divider arms is selected and fitted to the core barrel as described above. The cap member 18 is then placed on the top of the core barrel 12 and the divider 10 is placed over the cake 31 in a manner shown in FIG. 7. To insert the divider 10 firm pressure is placed on the cap member 18 and a downward thrust forces the cutting edges 25 of the divider arms 1 to 8 to cut into and through the cake until the arms engage the base 30 on which the cake is mounted. The base 14 of the core barrel 12 of the divider 10 cuts a circular cut-out in the centre of the cake to ensure uniform slicing and also to ensure that the slices do not taper to too thin a point. As shown in FIG. 6, a sliced cake 31 is shown with the divider 10 in position. As slices of the cake are removed, the divider arms 4 and 5 serve to insulate the adjacent slices of cake from air that would be caused by the gap made by the removed slice. In this manner, the cake 31 can be eaten progressively slice by slice over a lengthy period without the adjacent slices becoming crisp and stale through air contact. The divider 10 also has the advantage that it provides a simple and easy means of cutting the cake into equally sized or selected sizes in a straight clean cut that provides an aesthetically pleasing slice of cake.

The divider 10 is designed so that its components are simply detachable and thus easy to wash and is also designed to have a variety of uses by selection of the appropriate number and angular spacing of the divider arms.

It is understood that many modifications and variations are envisaged to the dividers described above including the use of different materials and changes to the precise configuration of the componentry. In another embodiment shown in FIG. 10 the divider 50 is used to slice a rectangular cake. The arms 68 are detachably secured to an open rectangular frame member 51 that serves as the core. The frame member 51 includes an elongate bar 52 with lateral sides 53 and 54 projecting from either end. Each side has an upwardly projecting flange 55, joined by a handle 56. The elongate bar 52 carries arrays of slots 58 and apertures 59 into which the arms 68 locate to define a closely spaced parallel array. The handle 56 is positioned along the central longitudinal axis of the cake with the frame member 51 positioned adjacent three sides of the cake and downward pressure on the handle causes the arms to cut the cake into a plurality of parallel rectangular slices.

It is further understood that the elongate bar 52 could be centrally positioned with a cutting edge on its underside so that downward pressure on the handle 56 produces two lines of parallel rectangular slices.

I claim:

1. A cake slicer and divider comprising a core with a plurality of arms detachably securable thereto to project radially from the core, said core including location means to support said arms, said location means being positioned in arrays at two ends of the core whereby a plurality of said arms may be attached to each end of the core to extend radially from the core, each pair of adjacent arms defining a segment and the number of segments being variable in dependence on the number of arms that are attached to the core, each arm being an elongate planar member with a cutting edge on an under edge, and a force transmitting member at an upper end of the core whereby hand pressure on the force transmitting member imparts a downward force on the core and arms to cause the cutting edges of the arms to slice a cake into slices enclosed between adjacent planar members so that the slicer and divider when in situ with a sliced cake protects the slices from air contact, the spacing of the array of location means at one end of the core being different from the spacing of the array of location means at the other end of the core so that the core can be inverted to vary the number of arms that can be attached to the core to permit altering the size of the segments by changing the number of arms attached to the core.

2. The cake slicer and divider according to claim 1 wherein one side edge of each elongate planar member defines a locating member which is arranged to be detachably secured to the location means on the core to hold the side edge of the arm against the core with the arm extending radially from the core.

3. The cake slicer and divider according to claim 1 wherein the force transmitting member has an engaging portion of greater cross-section than the core and wherein the force transmitting member is detachable from the core.

4. The cake slicer and divider according to claim 1, moulded in plastics.

* * * * *